June 21, 1938.　　　T. S. PARK　　　2,120,988

SCREEN WASHER

Filed Feb. 18, 1936

INVENTOR.
T. S. PARK.
BY Jesse R. Stone
Lester B. Clark
ATTORNEYS.

Patented June 21, 1938

2,120,988

UNITED STATES PATENT OFFICE 2,120,988

SCREEN WASHER

Tracy S. Park, Houston, Tex., assignor to Leslie A. Layne, Houston, Tex.

Application February 18, 1936, Serial No. 64,447

6 Claims. (Cl. 166—20)

The invention relates to a screen cleaner or washer particularly for use in washing the strainer or screens which are disposed in oil, gas and water wells.

It is one of the objects of the invention to provide a high pressure washer for screens whereby a jet of liquid is forced outwardly through the screen in order to dislodge the material which has accumulated in the screen openings and around the periphery of the screen.

Another object of the invention is to rearrange the deposit of filtering material about a well screen so that the finer particles will be removed and the coarser particles will settle by gravity about the screen so that the fine material which previously clogged the screen will be removed by circulation.

Another object of the invention is to provide a nozzle for washing screens wherein a true nozzle is provided so that the maximum velocity of the liquid discharging therefrom will be projected against the screen to be washed.

Another object of the invention is to provide a washer head with discharge nozzles so that the discharge will be transversely of the axis of the head.

Other and further objects of the invention will be readily apparent when the following description is considered in connection with the accompanying drawing wherein.

In the production of oil, gas and water from wells it is the usual practice to position a screen or strainer in the well through which the fluid being produced is to be strained in order to eliminate an inflow of sand, scale, and other foreign matter.

Figure 1:
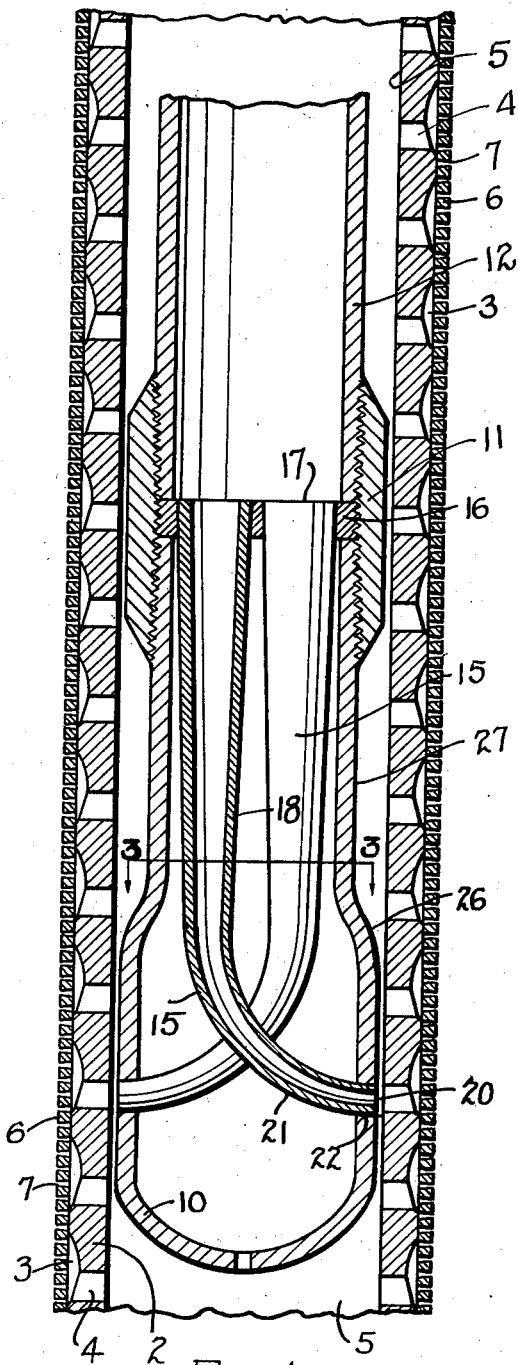
Fig. 1 is a vertical sectional view through a well screen in which the washer head is disposed in operative position to wash the screen.
Figure 2:
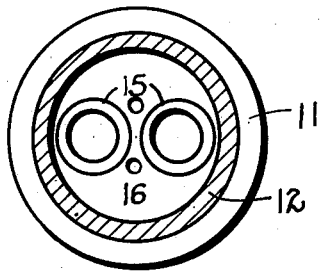
Fig. 2 is a view looking down on the top of the washer head after it is disposed in Fig. 1.

Various types of screens have been used for this purpose, one form being illustrated in Fig. 1, which embodies a pipe 2, which has been grooved at 3 on its periphery and an inlet port 4 provided adjacent each groove. Any other type of pipe may be provided so long as it has ports such as 4 through which the fluid being produced may enter the inside passage 5 of the pipe.

In the particular form of strainer here shown the pipe 2 has been wrapped with a wire 6, the wrappings of which are spaced apart a distance 7, which is predetermined depending upon the size of the sand which is to be excluded.

Needless to say after the screen has been set the sandy formation in which it is located will cave in around the screen and be carried toward the screen by the flow of fluid being produced. In time a deposit of this sand occurs in and around the wire 6 and in many instances may fill the strainer openings 7 as well as the grooves 3 and the ports 4. In some instances where the sand is coarser it will accumulate about the wire 6 and interfere with the efficiency of the screen.

In other instances the wells may be graveled by depositing a body of granular material about the screen either before or after it is located in the well. Naturally during the producing of the well the finer sand will filter through this gravel material and accumulate about the screen.

In either of the instances set out above it is desired to periodically wash out the screen and rearrange the granular material outside of the screen and to remove the finer material which has accumulated adjacent the screen.

The present invention directs itself to a tool for carrying out this desired procedure. The tool embodies a head or body 10, which is threaded to a coupling 11, which is in turn carried by a string of pipe 12. The string of pipe 12 extends to the surface and is known as the setting or operating string and through this string a liquid pressure will be applied by a suitable pump on the surface.

Disposed inside of the head or body 10 is a nozzle 15, the upper end being anchored to a plate 16, which is shown as being fixed between the lower end of the pipe 12 and the upper end of the body 10 in the coupling 11. These parts may be assembled together and screwed tightly in position so that there will be no leakage around the plate 16. The upper end 17 of the nozzle 15 may be welded or brazed to the plate 16 if desired so long as the fluid tight fit is provided.

The nozzle 15 is of particular construction in that it gradually tapers as seen in section by a gradual reduction of the size of the pipe 18 which makes up the nozzle. In this manner the velocity of the fluid passing through this nozzle is gradually increased and reaches a maximum at the discharge end 20 thereof. This is constructed on the same design as a fire hose nozzle or other nozzle allowing a maximum velocity to be obtained.

In order to direct this stream of liquid from the nozzle 15 transversely to the axis of the body 10 so that it will pass through the screen the nozzle is curved at 21 and is fixed in the opening 22 inside of the body 10. The curve 21 is a very gradual curve so that it will but slightly affect the velocity of the flow through the nozzle and the discharge stream will be against the inside face of the screen 2.

Figure 3:
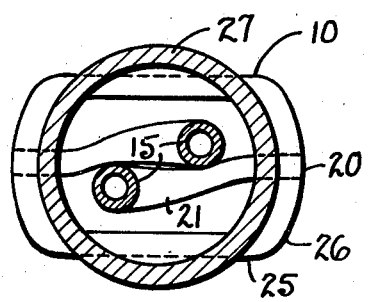
Fig. 3 is a section taken on the line 3—3 of Fig. 1.

In operation a high pressure stream of liquid will be forced down through the pipe 12, as seen in Fig. 1. Two nozzles 15 have been provided which project from the opposite sides of the body 10, as seen in Figs. 1 and 3. The pipe 12 will be raised and lowered or gradually rotated as desired so as to move the discharge streams over the entire inside face of the screen 2. When the discharging streams move into alignment with the ports 4 it seems obvious that there will be a high velocity discharge through the ports which will remove any scale or sediment in the ports and the grooves 3, as well as the passages 7 between windings of the wire 6. In this manner the screen will be thoroughly washed and any desired amount of movement of the nozzle may be had.

Fig. 3 shows the flattened configuration of the body portion 10 on the sides at 25 so that circulation of the liquid may be maintained and it can flow readily upward through the passage 5 in the screen. The body portion 10 extends laterally at 26 beyond the cylindrical portion 27 of the body so that the discharge port 20 will be located closely adjacent the inside face of the screen. In this manner the liquid will discharge through the ports 4 at a greater velocity. It is intended that the total overall width of the flattened portion 26 of the body will be substantially the same as the inside diameter of the screen pipe.

The enlarged coupling 11 serves to center the body in the pipe and maintain the discharge streams in direct alignment with the ports 4.

It seems obvious from the description of the foregoing apparatus that the material closely adjacent the screen wire 6 will be violently agitated by the discharge of liquid through the ports 4 and the screen openings 7. As this liquid discharges its escape will be upwardly around the screen and in through the upper openings 7 above the tool 10 and back into the screen. The agitation of the finer particles will cause them to be carried along with the flow of liquid and they may enter the screen and be carried upwardly from the well to be permanently removed. As to slightly larger particles, however, they will be agitated and carried away from the surface of the screen and the larger particles will settle in their place so that there will be an obvious rearrangement of the particles and filter around the outside of the screen. In event this filter has been made of gravel this gravel will be agitated and the finer particles which have filtered into the voids between the coarser gravel will be washed away by the flow of liquid, leaving the gravel in suitable filtering condition.

In event the deposit about the screen is only the natural cavings and sediment which has accumulated about the strainer than this washing operation will remove the finer particles, break up the cake of material about the screen, and result in a general loosening up of the formation about the well so that there may be a greater inflow of productive liquid.

After the washing operation has been completed the tool may be readily raised from the screen by lifting on the pipe 12.

Broadly, the invention contemplates a tool for washing the well wherein a nozzle is provided to discharge liquid at a maximum velocity directly through the ports in the screen and to in this manner rearrange the filtering material outside of the screen.

What is claimed as new is:

1. A well strainer washing tool comprising a body, a true nozzle member fixed within said body with the entrance end disposed upwardly, the discharge end of said nozzle member being curved and fixed to the body to discharge transversely to the axis of the body.

2. A well strainer washing tool comprising a body, a true nozzle member fixed within said body with the entrance end disposed upwardly, the discharge end of said nozzle member being curved and fixed to the body to discharge transversely to the axis of the body whereby a high velocity jet of liquid will impinge against the well strainer.

3. A well strainer washing tool comprising a body, a true nozzle member fixed within said body with the entrance end disposed upwardly, the discharge end of said nozzle member being curved and fixed to the body to discharge transversely to the axis of the body whereby a high velocity jet of liquid will impinge against the well strainer to dislodge debris therefrom.

4. A well screen cleaner comprising a body, having a discharge port in the side thereof, a pipe connected to said body, a plate secured to said body to close the bore from said pipe into said body, said plate having an opening therein, and a curved nozzle member having its discharge and entrance ends fixed in said port and opening respectively.

5. A well strainer washing tool comprising a body having a pipe connection thereon, said body having a flattened portion with a wall adapted to be closely juxtaposed to the wall of the strainer to be cleaned, an opening in said tool wall and a curved nozzle member having its discharge tip fixed in said opening.

6. A well screen cleaner comprising a body having flattened portions and walls adapted to be closely juxtaposed to the screen walls, said tool walls having ports therein, a pipe connection in said body, a pipe collar threaded upon said connection and adapted to guide the tool within the screen and nozzles within said body having their discharge tips connected to said ports whereby a high velocity jet will impinge against the well strainer from the closely juxtaposed port.

TRACY S. PARK.